US010435920B2

United States Patent
Ganeshan et al.

(10) Patent No.: US 10,435,920 B2
(45) Date of Patent: Oct. 8, 2019

(54) SAFETY SYSTEM FOR PREVENTING A VEHICLE DOOR FROM OPENING INTO TRAFFIC

(71) Applicant: Visteon Global Technologies, Inc., Van Buren Township, MI (US)

(72) Inventors: Prasanna Kumar Ganeshan, Tamil Nadu (IN); Marcus Walter Koch, Karlsruhe (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 15/865,515

(22) Filed: Jan. 9, 2018

(65) Prior Publication Data
US 2019/0211587 A1 Jul. 11, 2019

(51) Int. Cl.
| | | |
|---|---|---|
| *E05B 77/14* | (2014.01) | |
| *B60Q 9/00* | (2006.01) | |
| *B60R 21/017* | (2006.01) | |
| *B60J 5/04* | (2006.01) | |
| *B60R 21/015* | (2006.01) | |
| *E05B 77/02* | (2014.01) | |
| *B60Q 1/52* | (2006.01) | |
| *B60R 21/0134* | (2006.01) | |
| *B60R 21/01* | (2006.01) | |

(52) U.S. Cl.
CPC ............... *E05B 77/14* (2013.01); *B60J 5/04* (2013.01); *B60Q 1/525* (2013.01); *B60Q 9/006* (2013.01); *B60Q 9/008* (2013.01); *B60R 21/017* (2013.01); *B60R 21/0153* (2014.10); *E05B 77/02* (2013.01); *B60R 2021/01013* (2013.01); *B60R 2021/01034* (2013.01); *B60R 2021/01345* (2013.01)

(58) Field of Classification Search
CPC ..... E05B 77/14; E05B 77/02; B60R 21/0153; B60R 21/017; B60R 2021/01013; B60R 2021/01034; B60R 2021/01345; B60Q 9/006; B60Q 9/008; B60Q 1/525; B60J 5/04
See application file for complete search history.

(56) References Cited

U.S. PATENT DOCUMENTS

| | | |
|---|---|---|
| 2008/0218381 A1 | 9/2008 | Buckley et al. |
| 2013/0234844 A1 | 9/2013 | Yopp et al. |
| 2017/0218678 A1* | 8/2017 | Kothari .................. E05F 15/73 |

\* cited by examiner

*Primary Examiner* — Leon Flores
(74) *Attorney, Agent, or Firm* — Dickson Wright PLLC

(57) ABSTRACT

A system for preventing a door of a vehicle from opening into an object includes a detection module configured to identify an object within a danger zone of the vehicle and detect the opening of the door. The system further includes a locking mechanism coupled to the detection module and configured to lock the door in a partially open position if the object is identified within the danger zone and the opening of the door is detected.

17 Claims, 9 Drawing Sheets

SAFETY SYSTEM FOR PREVENTING A VEHICLE DOOR FROM OPENING INTO TRAFFIC

BACKGROUND

To prevent an accident with oncoming traffic, an occupant, such as a passenger or a driver of a vehicle, must carefully check for traffic before opening a door of the vehicle. If the occupant swings the door open into traffic approaching from behind the vehicle, the traffic, such as a pedestrian, bicycle, motorcycle, or another vehicle, may collide with the door. Occupants are frequently causing collisions by failing to safely open the doors. In fact, due to the frequency and severity of such collisions, a term "dooring" is used to describe accidents caused by opening a vehicle door with traffic from behind the vehicle. Dooring is dangerous and often causes extensive damage to property. Dooring, especially involving motorcycles or bicycles, can even result in death.

Modern vehicles may be equipped with a "dead corner sensor warning system." The warning system is typically integrated into a side or exterior rearview mirror of the vehicle. The warning system includes a sensor that detects traffic approaching from behind. The warning system provides an optical signal in the exterior rearview mirror or at a location inside the vehicle to warn the occupant of traffic approaching from behind or in a dead corner of the vehicle. Such a warning system, however, is a passive system that detects possible danger and merely provides a warning to the occupant. This warning system does not actively prevent a collision between the opening door and oncoming traffic. In other words, the warning system ultimately relies on the occupant to acknowledge the warning, understand the warning, and restrain from opening the vehicle door into traffic. Additionally, this type of warning system does not alert people outside of the vehicle that the occupant intends to open the door.

A safety system for opening a vehicle door that combines an automatic door locking system and the dead corner warning system to prevent possible collisions between an open vehicle door and oncoming traffic would reduce public cost, prevent accidents, reduce injuries, and even safe lives.

SUMMARY

This section provides a general summary of the present disclosure and is not a comprehensive disclosure of its full scope or all of its features, aspects, and objectives.

Disclosed herein are implementations of a system for preventing a door of a vehicle from opening into an object. The system includes a detection module configured to identify an object within a danger zone of the vehicle and detect the opening of the door. The system further includes a locking mechanism coupled to the detection module. The locking mechanism is configured to lock the door in a partially open position if the object is identified within the danger zone and the opening of the door is detected.

Also disclosed herein is a system for preventing a door of a vehicle from opening into an object. The system includes a detection module configured to detect a position of a vehicle door, detect a condition of an ignition, and identify the object within a door zone of the vehicle door. The system also includes a locking mechanism coupled to the detection module and configured to lock the door for a time period if the object is identified within the door zone.

Also disclosed herein is a safety system for opening a door of a vehicle. The safety system includes a body control module (BCM), and a traffic sensor. The BCM is configured to execute instructions stored on a non-transitory computer readable medium. The traffic sensor is coupled to the BCM and configured to capture traffic data. The safety system further includes a door sensor coupled to the BCM and configured to detect a door position and a locking mechanism coupled to the BCM and configured to lock the door. The BCM is further configured to define a door zone, receive the traffic data from the traffic sensor, and detect an object in the traffic data. The BCM is still further configured determine if the object is within the door zone, receive the door position from the door sensor, and determine if the door position is a closed position. If the object is within the door zone and the door position is the closed position, the BCM transmits instructions to the locking mechanism to lock the door.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following description is merely exemplary in nature and is not intended to limit the disclosure in its application or uses. For purposes of clarity, the same reference numbers are used in the description and drawings to identify similar elements. The term "vehicle" refers to any motorized or non-motorized vehicle. The term "occupant" refers to any person, such as a driver or a passenger, located inside of the vehicle or operating a door of the vehicle. The term "traffic" refers to any person, animal, object, or other vehicle proximate to the vehicle that moves in a direction toward or away from the vehicle. A person skilled in the art would recognize that other embodiments for practicing or using the invention are also possible.

Figure 1:
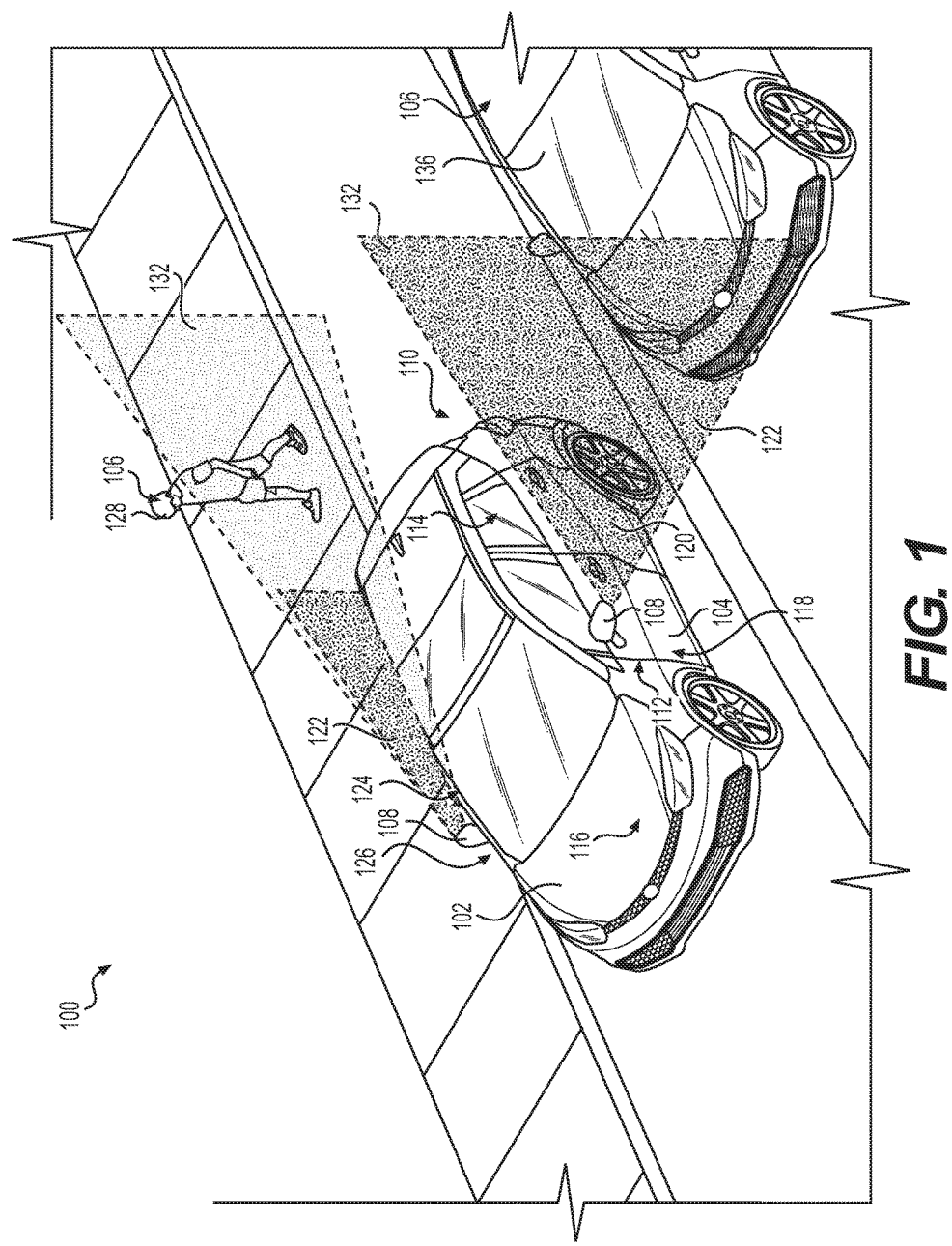
FIG. 1 is an elevated perspective view of a vehicle implementing an exemplary system for preventing a door of a vehicle from opening into traffic in accordance with one aspect of the present disclosure.

FIG. 1 illustrates an exemplary safety system, or system 100 of a vehicle 102 for preventing a door 104 of a vehicle 102 from opening into traffic in accordance with one aspect of the present disclosure. Specifically, the system 100 prevents the door 104 from opening into an object 106. The system 100 includes a detection module 206 and a locking mechanism 204.

The detection module 206 includes at least an external sensor 208 and a door sensor 210. The external sensor 208 is located on or in an external portion or exterior 116 of the vehicle 102. For example, the external sensor 208 is coupled to a side or exterior rearview mirror 108. The external sensor 208 may be integrated in the exterior rearview mirror 108 or an alternate device. The external sensor may be positioned in other locations of the vehicle 102, such as on the door 104, a side portion of the vehicle 102, or a rear portion 110 of the vehicle 102. For example, the external sensor 208 may be a rear parking sensor. The external sensor 208 may also be a traffic sensor used for autonomous driving. The external sensor 208 may include any sensing technology such as an electronic sensor, a mechanical sensor, camera, image sensing device, optical, thermal, laser, infrared, sonar, radar, LIDAR, capacitive, electric field, magnetic field, or GPS. The external sensor 208 is configured to capture traffic data of the environment surrounding the vehicle 100. Traffic data may include vehicles, objects, people, and/or animals that are stationary and/or moving. The external sensor 208 may capture traffic data from a view outside of the vehicle 102, such as a blind spot, a side view, a front view, or a back view. The external sensor 208 transmits the captured traffic data to a processor 202.

The door sensor 210 is coupled to the vehicle 102 at a location proximate to the door 104, such as a door hinge 112. The door sensor 210 may be coupled to the exterior 116 or an internal portion or interior 114 of the vehicle 102. For example, the door sensor 210 may be attached to a locking mechanism or a door body portion. The detection module 206 may include additional sensors. Any of the sensors in this disclosure may be located in the interior 114 or to the exterior 116.

The vehicle 102 may have a plurality of doors. The door 104 may represent any door on the vehicle 102. In one embodiment, the door 104 is a hinged door located on a driver side 118 of the vehicle 102. The vehicle 102 may also have a back door 120 located on the driver side 118 behind the door 104. The external sensor 208 may be used for both the door 104 and the back door 120. The system 100 may use the same danger zone 122 for both the door 104 and the back door 120. The system 100 may also be configured to differentiate between the door 104 and the back door 120. The system 100 detects the position of the occupant in the vehicle 102 and may not activate the system 100 for the back door 120 if an occupant is not detected in a back seat of the vehicle 102. The system 100 may also define separate danger zones 122 for the door 104 and the back door 120. For example, the system 100 may define a danger zone 122 for the back door 120 to include an area further behind the area defined for the door 104 because the back door 120 is positioned further behind the door 104. The system 100 may also include separate detection modules 206, such as separate external sensors 208, for the back door 120. Additionally, the back door 120 has a separate locking mechanism 204, preferably operatively coupled to the hinge 112 of the back door 120.

The vehicle 102 may also include a passenger door 124. The passenger door 124 is located on the opposite side of the vehicle 102 as the door 104, i.e., a passenger side 126. The passenger door 124 includes comparable components as the door 104. For example, the passenger door 124 may include separate locking mechanisms 204 and detection modules 206. Alternatively, the external sensor 208 may be coupled to the vehicle 102 in a location, such as on the roof or the rear portion 110. In this arrangement, the external sensor 208 may be configured to capture traffic data for all of the doors 104 and transmit the traffic data to the processor 202. The passenger door 124 may be coupled to the processor 202 or a separate processor. The passenger door 124 may be a door other than a standard hinged door. The passenger door 124 may be a sliding door, for example, the sliding door of a minivan. For the minivan, the locking mechanism 204 may operatively coupled to a slide portion or another portion that would allow the locking mechanism 204 to stop and lock the passenger door 124 in a partially open position 134. A person skilled in the art would be able to identify alternate locations on a variety of different vehicles and doors to position the locking mechanism 204 to accomplish its functions.

The system 100 uses the detection module 206 to detect the object 106. The object 106 may include at least one of a pedestrian 128, an animal, a bicycle 130, a motorcycle, another vehicle 136, or another object that may collide with the door 104. The system 100 defines the danger zone 122 and detects the object 106 within the danger zone 122. The danger zone 122 may be defined in a variety of ways. For example, the danger zone 122 may include at least one of a door swing zone, an exit zone, a monitoring zone 132, or another zone. The door swing zone is based on a door swing of the door 104. The door swing zone is an area encompassing a door swing. The door swing is the area between the door 104 in a fully open position and a closed position. The danger zone 122 may include an exit zone. The exit zone is an area based on the occupant exiting (or entering) the vehicle 102. The exit zone may include an area extending beyond the rear portion 110. The rear portion 110 is an area extending along and/or behind a rear side portion and/or a rear portion of the vehicle 102. Such an extended area provides additional clearance for the occupant to fully exit (or enter) the vehicle, close (and/or open) the door 104, and walk safely around the rear portion 110. The area of the danger zone 122 may be a predefined or predetermined area. The area of the danger zone 122 may also change over time. For example, the processor 202 evaluates the captured traffic data and defines the area of the danger zone 122 based a speed and a distance of the object 106 approaching the vehicle 102. The processor 202 defines the danger zone 122 having an appropriate size to prevent a potential collision. The processor 202 may define the danger zone 122 so that if the door 104 opens while the object 106 enters into the danger zone 122, there will a reasonable amount of time for the occupant to safely exit the vehicle 102 and close the door 104. The processor 202 may also define the danger zone 122 so that there is sufficient time to activate the system 100 to provide a warning by stopping the opening of the door 104 and locking the door 104 into the partially open position 134. Thus, the object 106 should be able to avoid a collision with the door 104 and/or the exiting occupant.

The system 100 may also detect the object 106 within the monitoring zone 132. The processor 202 defines the monitoring zone 132. The processor 202 may define the monitoring zone 132 in a variety of ways. For example, the monitoring zone 132 includes at least the danger zone 122. The monitoring zone 132 may also include at least one of the door swing zone, the exit zone, or another zone. The monitoring zone 132 may include an area larger than the danger zone 122, the door swing zone, and/or the exit zone. With a larger monitoring zone 132, the system 100 may capture and process a larger quantity of traffic data. If the system 100 captures and processes the larger quantity of traffic data, additional objects 106 may be detected and evaluated to determine if the object 106 will likely enter the danger zone 122. Additionally, the processor 202 may have more information to define the danger zone 122. The monitoring zone 132 will be described in further detail in FIG. 3.

The system 100 may define any of the zones described in this disclosure as a predefined or predetermined area. For example, the system 100 may store information pertaining to the door swing zone based on the door swing. The system 100 may continuously or periodically define any of the zones. The system 100 may also define any of the zones based on a specific situation, as described later in this disclosure. The system 100 may define the zone on the driver side 118 differently than the zone defined on the passenger side 126. For example, the processor 202 may define a much larger door swing zone for a hinged door than for an unhinged sliding door.

Figure 2:
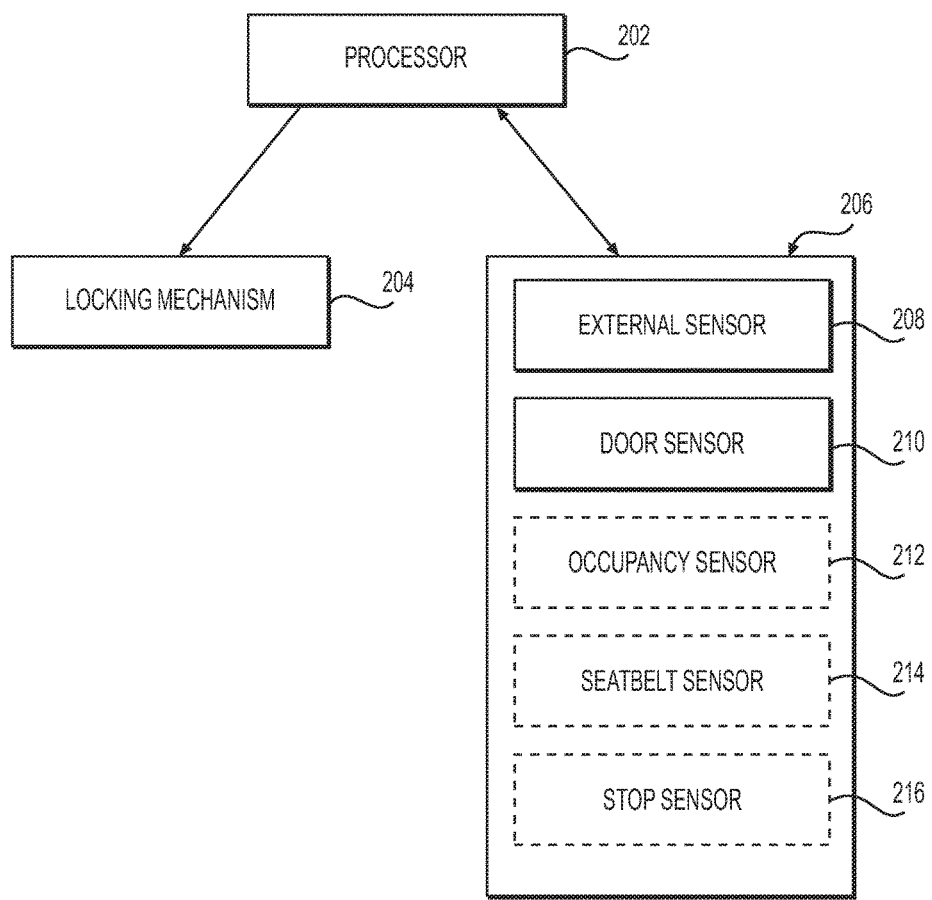
FIG. 2 is a simplified block diagram depicting exemplary components of the system in accordance with one aspect of the present disclosure.

FIG. 2 depicts exemplary components of the system 100 in accordance with one aspect of the present disclosure. The safety system 100 includes at least one microprocessor or processor 202 configured to execute instructions stored on a non-transitory computer readable medium. The processor 202 is a device that processes signals and performs general computing and arithmetic functions. The processor 202 may include multiple single and multicore processors, co-processors, and architectures. The processor 202, the locking mechanism 204, and the detection module 206 are operatively coupled.

For example, the external sensor 208 is coupled to the processor 202 and configured to capture traffic data. The door sensor 210 is coupled to the processor 202 and configured to detect a door position. The locking mechanism 204 is coupled to the processor 202. The locking mechanism 204 is configured to stop the door 104 in a partially open position 134. The locking mechanism 204 is also configured to lock the door 104 in the partially open position 134. The purpose of the partially open position 134 is to not only prevent the door 104 from swinging into traffic, but to allow the door 104 to open slightly to provide a warning. The warning alerts the occupant of the oncoming traffic, as well as an occupant of the oncoming traffic of the opening door 104. In other words, the system 100 is a safety measure to prevent collisions without the occupant feeling trapped in the vehicle 104.

As generally described, the processor 202 defines a danger zone 122 and receives the traffic data from the external sensor 208. The external sensor 208 is configured to detect an object 106 within a specific range from the door 104. The specific range or zone may be the predefined or predetermined area or range that varies depending on the traffic data collected as described below. The external sensor 208 may be configured to ignore traffic data outside of the specific range or zone. For example, if the processor 202 detects the object 106 in the traffic data, then the processor 204 determines if the object is within a specific range, namely, the danger zone 122. The processor 202 receives the door position from the door sensor 210 and determines if the door position is the open position. If the processor 202 determines that 1) the object 106 is within the danger zone 122 and 2) the door is in the open position, then the processor 202 transmits instructions to the locking mechanism 204 to stop the door 104. The processor 202 also transmits instructions to the locking mechanism 204 to lock the door 104 into place. When the door 104 is locked, the door 104 cannot substantially move in any direction. If the detection module 206 no longer detects the object 106 within the danger zone 122, the processor 202 transmits a signal to the locking mechanism 204 to unlock the door 104 from the partially open position 134.

In another embodiment, the external sensor 208 is configured to ignore traffic data after a time frame. The processor 204 is configured to determine the time frame. The processor 204 is further configured to determine if the object 106 will enter the danger zone 122 within the time frame. If the processor 204 determines that the object 106 will not enter the danger zone 122 within the time frame, then the processor 202 will ignore the object 106. If the processor 204 determines that the object 106 will enter the danger zone 122 within the time frame, then the processor 202 will determine when the object 106 actually enters the danger zone 122. The time frame may be a predefined or predetermined period of time. The processor 202 may change or vary the time frame.

The detection module 206 detects the object 106 within the danger zone 122 and detects the opening of the door 104. The detection module 206 is coupled to the locking mechanism 204. The locking mechanism 204 is preferably coupled to the door hinge 112, but may be coupled to another part of the vehicle 102. The locking mechanism 204 locks the door in the partially open position 134 if the object 106 is identified within the danger zone 122 and the opening of the door 104 is detected.

The detection module 206 includes at least the external sensor 208 and the door sensor 210. The detection module 206 may include additional sensors. More than one of the additional sensors may be included in the system 100. For example, the detection module 206 may include at least one of an occupancy sensor 212, a seatbelt sensor 214, and a stop sensor 216. The occupancy sensor 212 is coupled to the processor 202 and to the vehicle 102. For example, the occupancy sensor 212 may be positioned in a seat of the vehicle 102. Preferably, the occupancy sensor 212 is positioned in the interior 114 so that the occupancy sensor 212 may detect each and every occupant within the vehicle 102. The occupancy sensor 212 detects if an occupant is present in the vehicle 104 and transmits a signal to the processor 202. For example, if the vehicle 102 has five seats, then occupancy sensors 212 are positioned in proximity to all five potential occupants. The occupancy sensor 212 may be any type of occupant detection, such as seat weight detection. If the occupancy sensor 212 detects the occupant and transmits a signal to the processor 202, the processor 202 may activate the system 100. The processor 202 may deactivate if the occupancy sensor 212 does not detect an occupant.

Deactivating the system 100 may be desirable to the occupant. The system 100 may require power from the vehicle 102 and deactivating the system 100 when the system 100 is not in use minimizes energy waste. Furthermore, if the system 100 is not deactivated during certain situations, the system 100 may limit functionality of other features of the vehicle 102. For example, a parent has put the vehicle 102 into park to pick up a child. The system 100 may detect the child and identify the child as an object 106 within the danger zone 122. In this situation, the child would not be able to fully open the door 104 because the door 104 would stop and lock at the partially open position 134. The system 100 may include a manual deactivation feature, such as an override switch that the occupant may use to deactivate the system 100. The system 100 may also detect if an outside door handle located at the exterior 116 of the door 104 is touched or being operated to open the door 104. The system 100 may simply deactivate. The system 100 may also ignore the object 106 (i.e., the child) proximate the activated outside door handle. The system 100 may continue detecting other traffic data. If the system 100 detects another object 106 within the danger zone 122, the system 100 may prevent the door 104 from opening into the oncoming traffic. The system 100 would thereby be warning the child that there is oncoming traffic nearby.

The system 100 may have the override feature, such as the override switch, that, when activated, deactivates the system 100. The occupant may operate the override switch in an emergency situation or if the occupant determines that the object 106 is not in danger of colliding with the door 104. The occupant may operate the override switch by using voice command, pressing a button or switch, or using another system or method. The system 100 may be in a deactivated state unless the system 100 is activated. For example, the occupant turns on the system 100 for the system 100 to function.

The seatbelt sensor 214 is coupled to the processor 202 and to the vehicle 102. The seatbelt sensor 214 may be coupled to one or more seat belts or seat belt buckles. The seatbelt sensor 214 detects an unbuckled seatbelt proximate to the occupant. The processor 202 may activate the system 100 if the processor 202 detects the unbuckled seatbelt because it is likely that the occupant may open the door 104 after unbuckling the seatbelt.

The stop sensor 216 detects a stop position of the vehicle 102. The stop sensor 216 is coupled to the processor 202. The stop sensor 216 is also coupled to the vehicle 102. For example, the stop sensor 216 may be positioned proximate to a tire of the vehicle 102. The stop sensor 216 may be operatively coupled to another system of the vehicle 102. The stop sensor 216 may be a speedometer to detect when the vehicle 102 is moving and not moving. The speed of the vehicle, or lack thereof, may be determined by a stop sensor 216 or derived through another processor of the vehicle 102. The processor 202 may activate the system 100 if the processor 202 detects the stop position. The system 100 may deactivate if the vehicle 102 is moving because it is unlikely that a door 104 will open when the vehicle 102 is moving.

Any of the additional sensors may be included or excluded from the system 100 and used in any order or combination. For example, the detection module 206 may include a sensor for detecting movement of an inner door handle of the vehicle 102. The system 100 may deactivate if the door 104 is opened but the sensor does not detect movement of the inner door handle. In other words, if someone opens the door from outside the vehicle, the system 100 will not prevent the door 104 from opening. The system 100 may also have an airbag sensor configured to detect when an airbag is deployed. If the airbag is deployed, then the system 100 may deactivate so that the occupant may open the door 104 to exit the vehicle 102 after an accident regardless if the system 100 detects an object 106 within the danger zone 122. The system 100 may include additional and/or fewer components and is not limited to those illustrated in FIG. 2.

Figure 3:
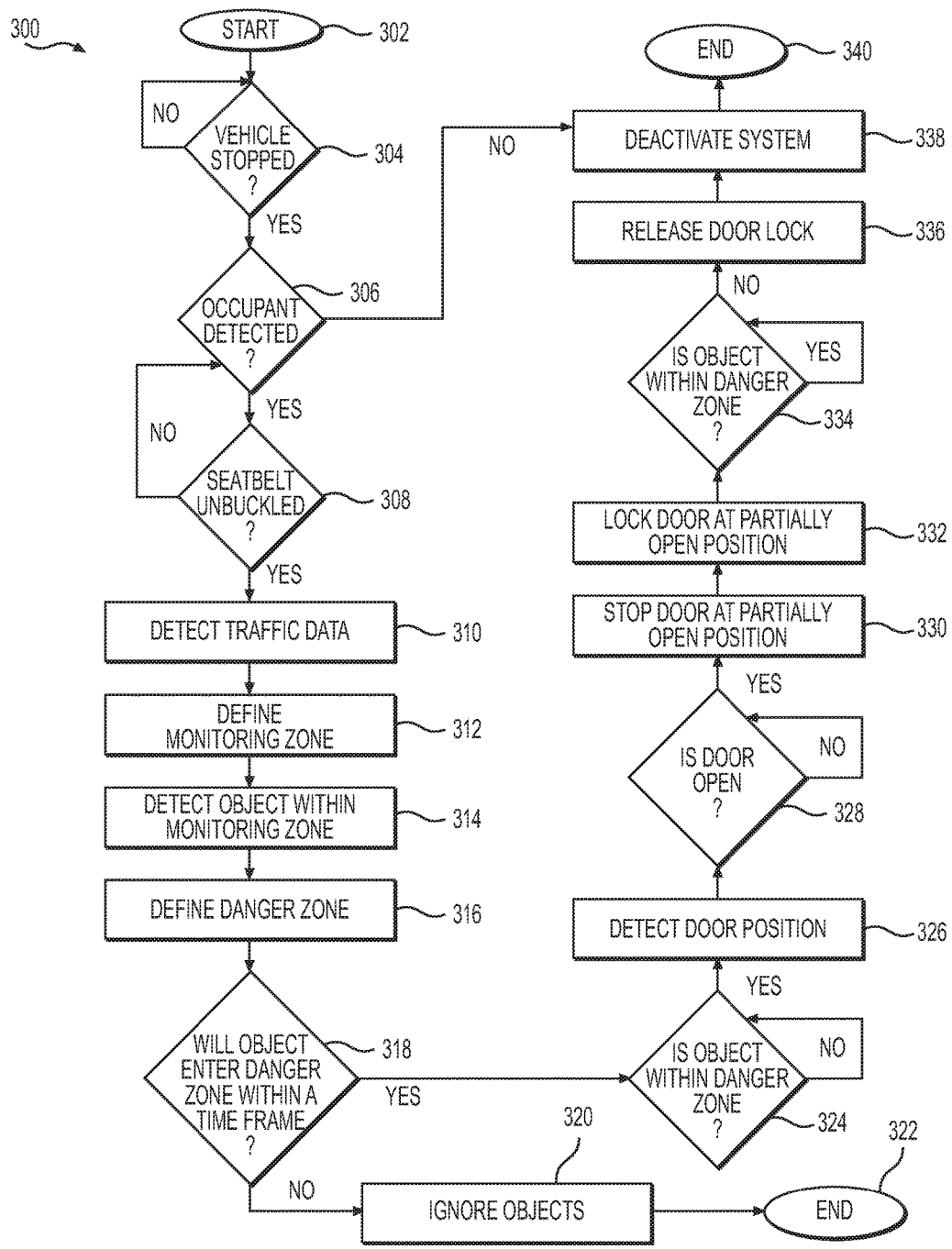
FIG. 3 is a flow chart illustrating an exert/platy process for implementing the system in accordance with one aspect of the present disclosure.

FIG. 3 illustrates an exemplary process 300 for stopping an opening of the door 104 of the vehicle 102 in accordance with one aspect of the present disclosure. The process 300 generally uses an automatic door blocking system (e.g., the locking mechanism 204) and a dead corner warning system (e.g. the detection module 206) to prevent possible impacts from traffic traveling toward the vehicle 102 from behind any door 104. The system 100 detects oncoming traffic and blocks the door opening process early enough to prevent the door 104 from getting into the way of or colliding with the oncoming traffic.

At step 300, the process 302 starts. At decision step 304, the system 100 determines if the vehicle 102 is stopped. If the vehicle 102 has not stopped (i.e., the vehicle 102 is moving), then the process loops at decision step 304. Although not shown, if the vehicle is moving, the process continues to step 338 and the system 100 deactivates. The process 300 then ends at step 340. The system 100 may activate the detection module 206 and continue through the processes of process 300. Because the system 100 prevents the occupant from fully opening the door 104, the system 100 acts as a safety measure. For example, if a child opens the door 104 when the vehicle 102 is moving, the system 100 prevents the door 104 from opening enough that the child could fall out of the moving vehicle. If the vehicle 102 has stopped (e.g., the vehicle 102 is parked or at a stop and is not moving), the process continues to decision step 306. The system 100 may also activate the detection module 206.

At decision step 306, the system 100 determines if the occupant is located inside of the vehicle 102. If the system 100 does not detect the occupant, then the process continues to step 338 to deactivate the system 338. After the system 100 is deactivated, the process ends at step 340. In other words, if no occupant is detected, the system 100 prevents the operation of the system 100 from continuing to process. The system 100 may not be active at all times. For example, a person returning to a parked car may not wish to be detected as the object 106 in the danger zone 122, which would prevent the door 104 from opening. Additionally, the system 100 may require electrical power from a vehicle battery and should deactivate during certain situations (e.g. vehicle is moving, no occupant is detected, vehicle turned off, within a time period after stopping or turning off). If the occupant is detected, the process continues to decision step 308. The system 100 may also activate the detection module 206.

At decision step 308, the system 100 determines if a seatbelt located in the vehicle 102 is unbuckled. If the seatbelt is not unbuckled, then the process loops back to decision step 306 to detect the occupant. If the system 100 detects that the seatbelt is unbuckled and that the unbuckled seatbelt is proximate the occupant, then the process continues to step 310. The system 100 may also activate the detection module 206.

At step 310, the system 100 detects traffic data. The traffic data includes objects traveling from behind the vehicle 102 in a direction toward the vehicle 102. The traffic data may include objects traveling in any direction proximate to the vehicle 102. The traffic data may include objects in a stationary position. The traffic data may include the speed of the objects and the distance of the objects from the vehicle 102. The system 100 processes the traffic data and identifies any objects that are in a specific range from the vehicle 102. The system 100 may identify such an object as the object 106. For example, the system 100 processes the traffic data and identifies the object 106 within a zone, such as the monitoring zone 132 as defined in step 312 or the danger zone 122 as defined in step 316. The system 100 detects and processes traffic data early enough to prevent the door 104 from swinging open in the way of possible oncoming traffic. Preferably, the system 100 detects and processes traffic data from at least the driver side 118 and the passenger side 126. The system 100 may also detect traffic data from other locations of the vehicle 102, such as at each door 104 of the vehicle 102 or at the rear portion 110.

At step 312, the system 100 defines the monitoring zone 132. The system 100 may define the monitoring zone 132 in a variety of ways. The monitoring zone 132 may be a predetermined or predetermined area. The system 100 may change or vary the area defined as the monitoring zone 132. For example, the monitoring zone 132 may be based on the speed and the distance of the object 106 traveling toward the vehicle 102. Preferably, the system 100 defines the monitoring zone 132 from at least the driver side 118 and the passenger side 126. The system 100 may also define the monitoring zone 132 from other locations of the vehicle 102, such as from each door of the vehicle 102 or from the rear portion 110. The system 100 may define the monitoring zone 132 from the exterior rearview mirror 108 located on the door 104 and from the exterior rearview mirror 108 located on the passenger door 124. Preferably, the system 100 implements the process 300 for at least two doors 104 located, e.g. the door 104 and the passenger door 124. The system 100 may differentiate the monitoring zone 132 for the driver side 118 from the monitoring zone 132 for the passenger side 126.

At step 314, the system 100 detects an object within the monitoring zone 132. The system 100 monitors the traffic data located within the monitoring zone 132. If the object is detected within the monitoring zone 132, the system 100 determines whether the detected object is the object 106. For example, if an object is detected traveling toward the vehicle 102, the system 100 may determine that the detected object is the object 106. If an object is detected within the monitoring zone 132 but traveling away from the vehicle 102, the system 100 may determine that the detected object is not the object 106.

At step 316, the system 100 defines the danger zone 122. The system 100 may define the danger zone 122 in a variety of ways. The danger zone 122 may be a predetermined or predetermined area. The system 100 may define the danger zone 122 within the monitoring zone 132. The system 100 may change or vary the area defined as the danger zone 122. For example, the danger zone 122 may be based on the speed and the distance of the object 106 traveling toward the vehicle 102. As best shown in FIG. 1, the system 100 detects the pedestrian 128 within the monitoring zone 132 located proximate to the passenger side 126. The system 100 does not detect the pedestrian 128 within the danger zone 122. The danger zone 122 is a smaller area than monitoring zone 132. The system 100 may define the danger zone 122 as the same or similar size as the monitoring zone 132. For example, the vehicle 136 is traveling toward the vehicle 102 proximate to the driver side 118. The system 100 detects the vehicle 136 within the monitoring zone 132 and within the danger zone 122. The danger zone 122 is the same area as monitoring zone 132. In this example, a larger danger zone 122 is used to prevent collisions with the vehicle 136. If oncoming traffic is approaching at a certain speed (e.g., a faster speed), the object 106 may collide with the vehicle 102 in a shorter time frame and the object 106 may quickly swerve or switch lanes to avoid such a collision. The swerving or switching of lanes may cause a collision with other traffic or objects. Providing an earlier alert or warning to fast approaching oncoming traffic may minimize accidents from occurring.

For a typical vehicle with two or four doors, the system 100 defines the danger zone 122 from at least the driver side 118 and the passenger side 126. The system 100 may define the danger zone 122 from the exterior rearview mirror 108 located on driver side and from the exterior rearview mirror 108 located on the passenger door 124. The system 100 may also define the danger zone 122 from other locations of the vehicle 102, such as from each door 104 of the vehicle 102 or from the rear portion 110. Preferably, the system 100 implements the process 300 for at least two doors 104 located, e.g. the door 104 and the passenger door 124.

The system 100 differentiates the danger zone 122 on the driver side 118 from the danger zone 122 on the passenger side 126. Preferably, the system 100 implements the process 300 for at least two doors 104 located on at least two sides of the vehicle 102. Thus, the system 100 may activate process 300 on one side of the vehicle 102 but not the other. The system 100 may also define the zones differently on different doors on the same side of the vehicle. For example, the system 100 may define the danger zone 122 differently for the door 104 and the back door 120. The object 106 may enter the danger zone 122 for the back door 120; however, the occupant may have enough time to safely exit the vehicle 102 from the door 104 before the object 106 enters the danger zone 122 for the door 104.

The system 100 may combine the steps for the defining the monitoring zone 132 and/or defining the danger zone 122. The system 100 may also skips steps, such as step 318 for determining whether the object will enter the danger zone within a time frame. For example, after the system 100 defines the danger zone 122, the process may proceed to step 324 to determine if the object 106 is within the danger zone 122.

At decision step 318, the system 100 determines if the object 106 will enter the danger zone 122 within the time frame. The time frame may include any period of time such as a predefined or predetermined amount of time after the traffic is detected. The system 100 may determine the time frame based on the speed and location of the object 106 within the monitoring zone 132. For example, if the object 106 is within the monitoring zone 132, the system 100 predicts or estimates an expected entry time into the danger zone 122. The expected entry time is an amount of time required for the object 106 travel from a current position to the danger zone 122. If the object 106 does not enter the danger zone 122 within a certain time range of the expected entry time, then the system 100 may proceed to step 320 and ignore the object 106. The system 100 then proceeds to step 322 and ends the process 300. In another example, if the pedestrian 128 is walking toward the vehicle 102 and decides to window shop or plug a parking meter, the pedestrian 128 may be located within the monitoring zone 132 and never enter the danger zone 122. The system 100 may ignore the pedestrian 128 after a period of time and end the process 300. Additionally, the system 100 may ignore the pedestrian 128 if the pedestrian is within the danger zone 122 but not significantly moving. The system 100 may proceed to the below steps in the process but release the door lock at step 336 after the time frame has elapsed, such as an idle period. The idle period is an amount of time that the object 106 is within one of the zones but not significantly moving. The system 100 may ignore the object 106 having the idle period over a certain amount of time. The idle time may be a predetermined amount of time or a variable amount of time. Based on the speed and distance of the object 106 and the idle time, the system 100 may redefine the danger zone 122 to exclude the object 106 from the danger zone. The object 106 is ignored and the process 300 continues to step 322 and ends.

At step 320, the system 100 ignores the object 106 if the system 100 determines that the object 106 will not enter the danger zone 122 within the time frame. After the object 106 is ignored, the process 300 continues to step 322 and ends.

At decision step 324, the system 100 determines whether the object 106 is within the danger zone 122. If the system 100 determines that the object 106 is not within the danger zone 122, then the process loops at step 324. If the system 100 determines that the object 106 is within the danger zone 122, then the process continues to step 326.

At step 326, the system 100 detects the door position of the door 104. The door position may be the closed position, the partially open position 134, or the fully open position. The system 100 may detect the door position as soon as the door begins to open. The system 100 may detect the door position when an inside door handle is operated. The inside door handle is a door handle located in the interior of the door 104. The system 100 may also detect whether the outside door handle is operated within or outside of the vehicle 102. In other words, the system 100 may differentiate between who is opening the door: the occupant or someone from outside the vehicle 102.

At decision step 328, the system 100 uses the information detected of the door position from step 324 to determine whether the door 104 is in the open position. If the system 100 determines that the door 104 is not open, then the process loops at step 328. The system 100 may stop the loop if the door 104 is not opened within a time period. After the system 100 determines that the door 104 is opening, the process continues to step 330.

At step 330, the system 100 stops the door 104 at a certain position. If the object 106 is traveling toward the vehicle 102, the vehicle's door opening function is automatically stopped or disabled so that the door cannot swing open beyond the certain open position. Preferably, the system 100 stops the door at the partially open position 134. Ideally, the partially open position 134 is at about 10 mm from the closed position. The partially open position may be a position greater or less than 10 mm from the closed position. This is an ideal position because it provides a warning to both the occupant and the object 106 and prevents the door 104 from swinging into traffic. The system 100 provides a warning to the occupant desiring to open the door 104 by stopping the door 104 from opening further. The stopping acts as a warning to the occupant about an unsafe door opening condition. The stopping also acts as a warning to the object 106. The object 106 may observe the door 104 at the partially open position 134 and react accordingly. For example, the object 106 may be a motorcycle driving toward the vehicle 102. The motorcycle may observe the door 104 at the partially open position 134 and have enough time to safely maneuver away from the door 104.

At step 332, the system 100 locks the door 104 at the certain position of step 330. Preferably, the system automatically locks the door 104 at the partially open position 134. The system 100 may lock the door at about the same time that the system 100 stops the door. When the door 104 is locked, the occupant cannot substantially move the door 104 in any direction. The system 100 may be configured to not disable other features of the door 104, such as the window from rolling up or down. After the system 100 locks the door 104, the process proceeds to decision step 334. In one embodiment, the system 100 includes the manual deactivation feature, such as the override switch, to release the door lock.

At decision step 334, the system 100 determines whether the object 106 is within the danger zone 122. If the system 100 determines that the object 106 is still within the danger zone 122, then the process loops at step 334. If another object 106 has entered the danger zone 122, the system 100 will wait until all of the objects 106 have exited the danger zone 122. If the system 100 determines that the object 106 is not within the danger zone 122, then the process continues to step 336.

At step 336, the system 100 releases the door lock. In other words, if the door 104 is stopped and locked but the system 100 does not detect object 106 within the danger zone 122, the system 100 deactivates the lock on the door 104. After the door lock is unlocked, the door 104 functions as a regular vehicle door and may be freely opened or closed. For example, the occupant will be able to fully open the door 104 or close the door 104. After the door 104 is unlocked, the process continues to step 338. At step 338, the system 100 deactivates the system 100 and ends the process 300 at step 340.

The process 300 may include additional and/or fewer steps and is not limited to those illustrated in FIG. 3. In one embodiment, the process 300 for stopping the opening of the door 104 includes defining the danger zone 122, detecting the object 106 within the danger zone 122, detecting the opening of the door 104. The process 300 will proceed with stopping the opening of the door 104 if the object 106 within the danger zone 122 is detected and the opening of the door 104 is detected. In another embodiment, the process 300 includes identifying the driver side 118 proximate to the object 106 detected within the danger zone 122, differentiating the driver side 118 from the passenger side 126, and stopping the door 104 attached to the driver side 118. For example, if the system 100 detects that the object 106 is traveling in a direction toward the driver side 118 and enters into the corresponding danger zone 122, the system 100 will prevent the door 104 attached to the driver side 118 from opening beyond the partially open position 134. The system 100 will not stop the passenger door 124 from opening, unless there is another object 106 detected within the danger zone 122 located on the passenger side 126.

In other embodiments, the process 300 may exclude decision steps 304, 306, and 308 detecting movement, occupancy, and unbuckling a seatbelt, respectively. The process 300 may also exclude steps 312 and 314 for defining and detecting objects within the monitoring zone 132. The process 300 may further exclude decision step 318 for predicting or estimating whether the object 106 will enter into the danger zone 122 and steps 320 and 322 for ignoring the object 106 not predicted to enter and ending the process. Additional steps may be added, but are not limited to the additional steps described in this disclosure. Moreover, the system 100 may implement the steps in a different order than shown in the process 300. For example, decision steps may 304, 306, and 308 detecting movement, occupancy, and unbuckling the seatbelt, respectively, may be changed such that occupancy is detected first. Alternatively, the system 100 may implement certain steps simultaneously, such as steps 330 and 332 for stopping and locking the door 104 at the partially open position 134. The system 100 may implement steps 338 and 340 to deactivate the system 100 and end the process 300 at the same time.

Figure 4A:
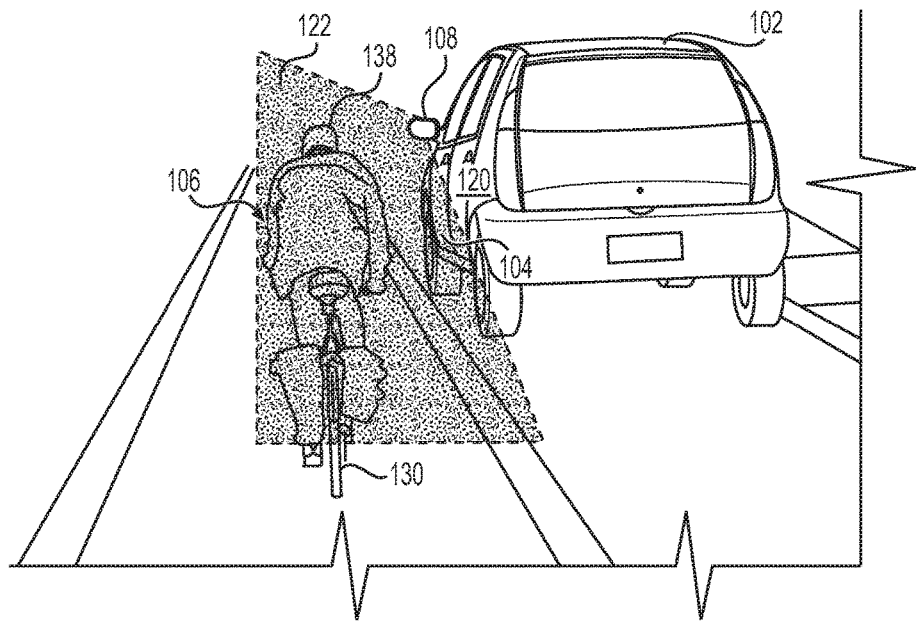
FIG. 4A is a perspective view of traffic approaching a vehicle from behind with a door in a closed position.

FIG. 4A illustrates an example of traffic, e.g., a bicycle 130, approaching the vehicle 102 from behind. For simplicity, the processes described in 4A and 4B are example process and do not necessarily represent all of the process that the system 100 may or may not implement. In this embodiment, the system 100 detects traffic data and defines the danger zone 122. The system 100 determines that at least part of the bicycle 130 is within the danger zone 122. The system 100 detects that, the door 104 is in the closed position. The system 100 continues to detect the door position until it detects the open position, as shown in FIG. 4B.

Figure 4B:
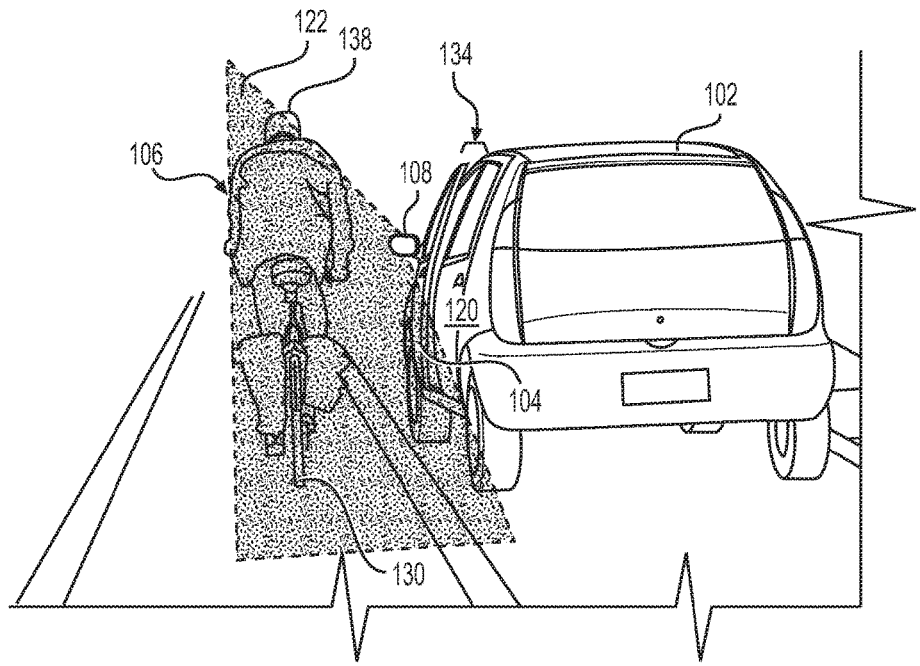
FIG. 4B is a perspective view of the system activated in accordance with one aspect of the present disclosure.

FIG. 4B illustrates an activated safety system with the door in the partially open position 134 as the bicycle 130 in FIG. 4A is within the danger zone 122 in accordance with one aspect of the present disclosure. Because the system 100 determined that the door 104 was open, the system 100 automatically stopped the door 104 at the partially open position 134. The system 100 also automatically locked the door 104 in the partially open position 134. At this point, the system 100 has provided a warning to the occupant that traffic is present and that it is not safe to fully open the door 104. The system 100 also provides a warning to an operator 138 of the bicycle 130. The warning alerts the operator 138 that the occupant in the vehicle and trying to open the door 104. Because the door 104 is locked into place, the operator 138 will not need to swerve into other potential oncoming traffic to avoid colliding with the door 104, The operator 138 will be able to safety maneuver the bicycle 130 through the danger zone 122. The system 100 continues to detect the bicycle 130 traveling in the danger zone 122. After the bicycle 130 has fully exited the danger zone 122, the system 100 automatically releases the door lock and deactivates.

The methods and systems described in this disclosure act as an alert or a warning system for both occupants and objects outside of a vehicle. It is intended for the system 100 to allow the door 104 to partially open before stopping the door from opening further and locking the partially open door into place when the object 106 is within the danger zone 122. Preferably, the door 104 is locked in the partially open position 134 about 10 mm from a closed position. The door 104 positioned in the partially open position 134 will act as the alert or warning to the occupants and the objects. Moreover, by allowing the door 104 to partially open, the occupants do not feel trapped inside of the vehicle 102 by accident. For example, the door not opening due to a malfunction of the door.

Figure 5:
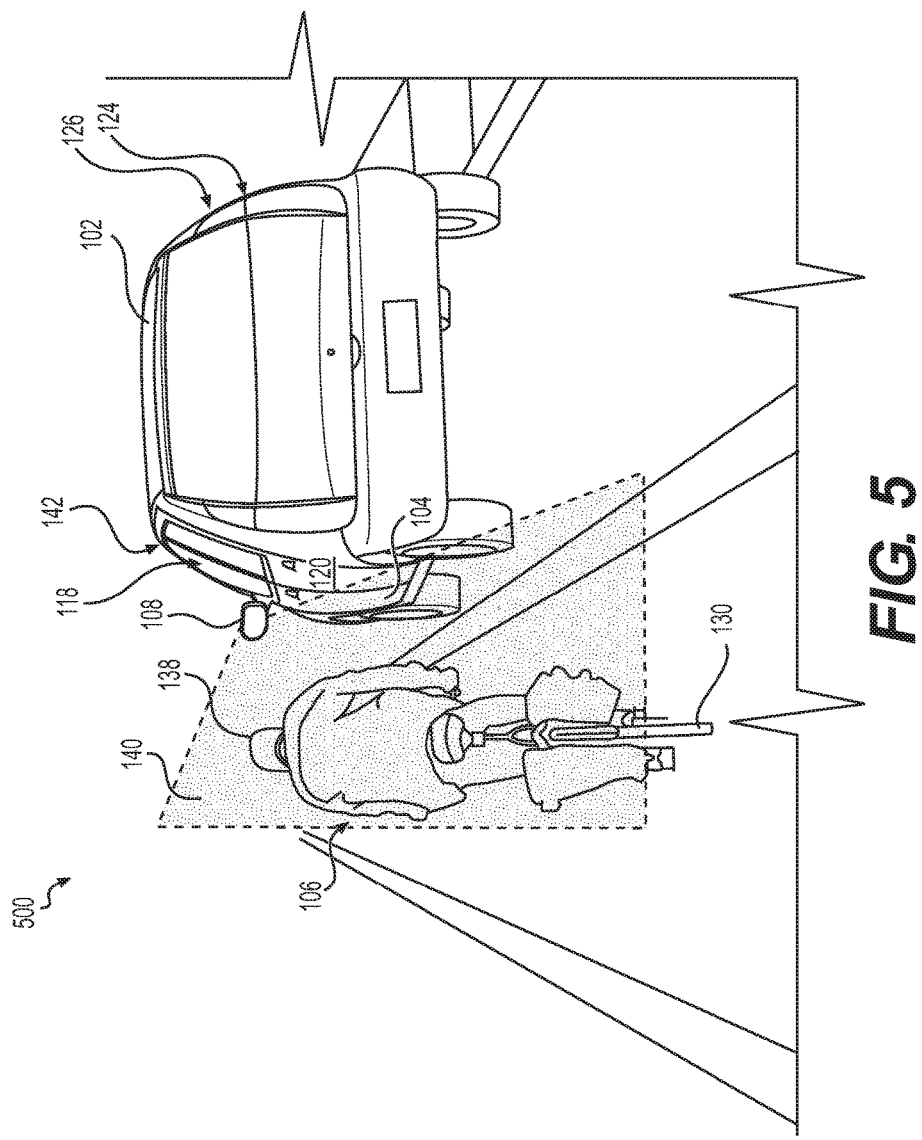
FIG. 5 is a perspective view of a vehicle implementing an exemplary system for preventing a door of a vehicle from opening into traffic approaching the vehicle in accordance with one aspect of the present disclosure.

Similar to FIGS. 4A and 4B, FIG. 5 illustrates an exemplary safety system, or system 500 of a vehicle 102 for preventing a door 104 of the vehicle 102 from opening into traffic in accordance with one aspect of the present disclosure. More specifically, FIG. 5 illustrates an example of an object 106 in traffic, e.g., a cyclist or the operator 138, approaching the vehicle 102 from behind. The system 500 detects traffic data and defines a door zone 140. The system 500 is configured to determine when at least part of the object 106 is within the door zone 140. The system 500 also detects a position of the door 104 and a condition of an ignition 142 of the vehicle 102. In this illustration, the door 104 is in a closed position and the ignition 142 is an off condition. The system 500 prevents the door 104 from opening into the object 106. More specifically, the system 500 detects that the object 106 is within the door zone 140 and locks the door 104 until a time period has elapsed so that the door 104 will not contact the object 106 if the door 104 is opened.

Figure 6:
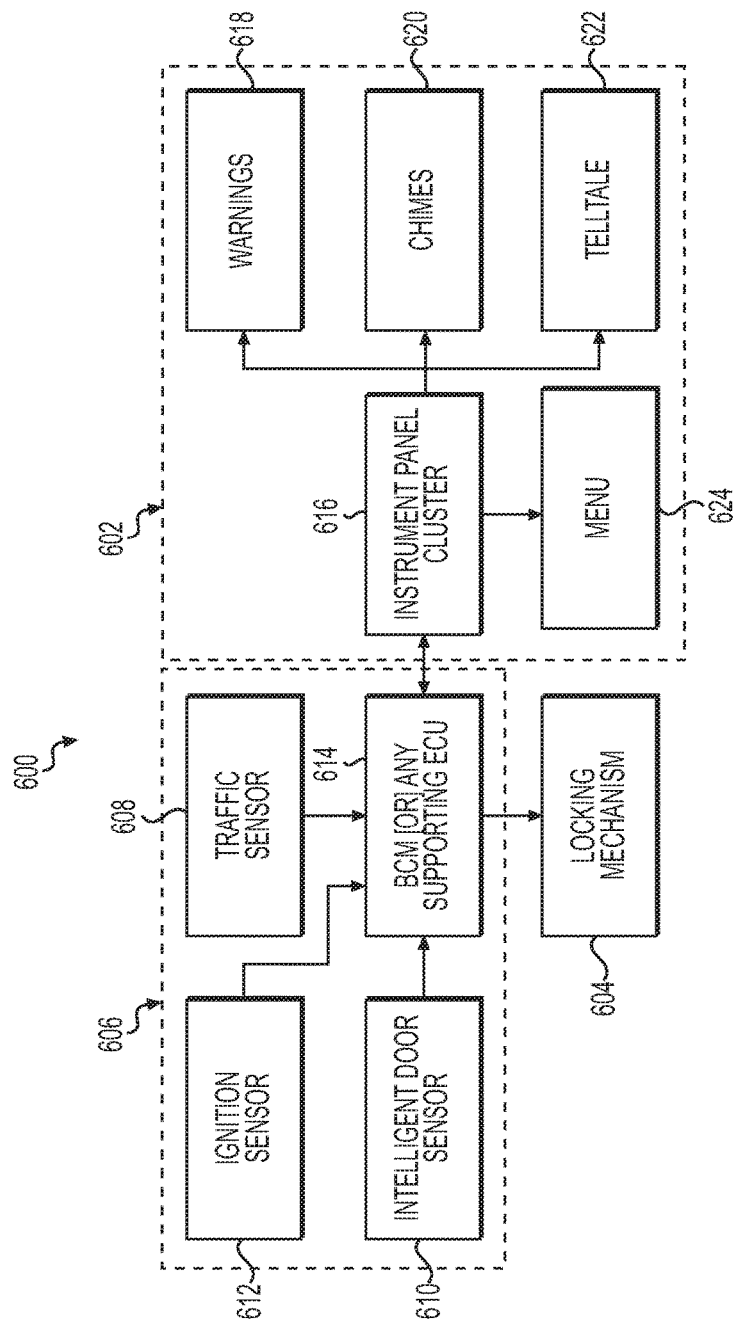
FIG. 6 is a simplified block diagram depicting exemplary components of the system in accordance with one aspect of the present disclosure.

FIG. 6 illustrates exemplary system components 600 of the system 500, which includes a detection module 606, an alert module 602, and a locking mechanism 604. The detection module 606 includes at least a traffic sensor 608, an intelligent door sensor (e.g., door sensor 610), an ignition sensor 612, and a body control mode (e.g., BCM 614). The alert module 602 is coupled to the detection module 606 and includes at least an instrument panel cluster 616, a warning 618, a chime 620, a telltale 622, and a menu 624.

The traffic sensor 608 of the detection module 606 may be located on or in an external portion or exterior of the vehicle 102. For example, traffic sensor 608 may be coupled to or integrated in a mirror 108, such as an exterior side view mirror, a rearview mirror, or an alternate device. The traffic sensor 608 may be positioned in other locations of the vehicle 102, such as on the door 104, a side portion of the vehicle 102, or a rear portion of the vehicle 102. For example, the traffic sensor 608 may be a rear parking sensor. The traffic sensor 608 may also be a traffic sensor used for autonomous driving. Alternatively, the traffic sensor 608 may be coupled to the vehicle 102 in a location, such as on the roof or the rear portion 110. The traffic sensor 608 is coupled to the BCM 614 and configured to capture traffic data. The traffic sensor 608 transmits the captured traffic data to the BCM 614. The traffic sensor 608 may be configured to capture traffic data for all of the doors 104 and transmit the traffic data to the BCM 614. The traffic sensor 608 may include any sensing technology such as an electronic sensor, a mechanical sensor, camera, image sensing device, optical, thermal, laser, infrared, sonar, radar, LIDAR, capacitive, electric field, magnetic field, or GPS. The traffic sensor 608 is configured to capture traffic data of the environment surrounding the vehicle 102. The traffic sensor 608 is also configured to capture objects 106 within the traffic data traveling in a direction toward the vehicle 102. Traffic data may include vehicles, objects, people, and/or animals that are stationary and/or moving that may collide with the door 104, if the door 104 is opened. The traffic sensor 608 may capture traffic data from a view outside of the vehicle 102, such as a blind spot, a side view, a front view, or a back view.

The door sensor 610 of the detection module 606 may be coupled to the vehicle 102 or embedded within the door 104. The door sensor 610 may be coupled to the exterior or interior of the vehicle 102. For example, the door sensor 610 may be attached to the locking mechanism 604 or to a door body portion. The door sensor 610 is further coupled to the BCM 614 and configured to detect a door position. The detection module 606 may include additional sensors and are not limited to the arrangements or locations described in this disclosure.

The vehicle 102 may have a plurality of doors 104. The door 104 may represent any door on the vehicle 102. In one embodiment, the door 104 is a hinged door located on a driver side 118 of the vehicle 102. The vehicle 102 may also have a back door 120 located on the driver side 118 behind the door 104. The traffic sensor 608 may be used for both the door 104 and the back door 120. The system 500 may use the same door zone 140 for both the door 104 and the back door 120. The system 500 may also be configured to differentiate between the door 104 and the back door 120. The system 500 may also define separate door zones 108 for the door 104 and the back door 120. For example, the system 500 may define a door zone 140 for the back door 120 to include an area further behind the door zone 140 defined for the door 104 because the back door 120 is positioned further behind the door 104. The system 500 may also include a separate detection module 606, such as a separate traffic sensor 608 for the back door 120.

The vehicle 102 may also include a passenger door 124. The passenger door 124 is located on the opposite side of the vehicle 102 as the door 104, i.e., on the passenger side 126 of the vehicle 102. The passenger door 124 includes comparable components as the door 104. For example, the passenger door 124 may include a separate locking mechanism 604 and a separate detection module 606. As with the door 104 and the back door 120, the passenger door 124 may be coupled to the BCM 614 and/or a separate processor. Any of the doors 104, such as the passenger door 124, may be a door other than a standard hinged door. For example, the passenger door 124 may be a sliding door of a minivan. For the minivan, the locking mechanism 604 may operatively coupled to a slide portion or another portion that would allow the locking mechanism 604 to lock the passenger door 124. A person skilled in the art would be able to identify alternate locations on a variety of different vehicles and doors to position the locking mechanism 604 to accomplish its functions. Additionally, the door 104, the back door 120, and the passenger door 124 are each operatively coupled to separate locking mechanisms 604. The locking mechanisms 604 are further coupled to the BCM 614 and configured to lock and unlock the respective doors.

The ignition sensor 612 of the detection module 606 may be operatively coupled to the vehicle 102. The ignition sensor 612 is further coupled to the BCM 614 and configured to detect a condition of an ignition. For example, the ignition sensor 612 can detect if the ignition is in an off condition or an on condition. The ignition sensor 612 may also detect the operating level of an engine, for example, if the engine is running at less than or equal to 500 RPM. The ignition sensor 612 may also detect a stop position of the vehicle 102. For example, the ignition sensor 612 may be positioned proximate to a tire of the vehicle 102. The ignition sensor 612 may be operatively coupled to another system of the vehicle 102. The ignition sensor 612 may be a speedometer to detect when the vehicle 102 is moving and not moving. The speed of the vehicle, or lack thereof, may be determined by the ignition sensor 612 or derived through another processor of the vehicle 102. The BCM 614 may activate the system 500 if the BCM 614 detects the stop position or the off condition. The system 500 may deactivate if the vehicle 102 is moving or if the ignition is in the on condition because it is unlikely that a door 104 will open when the vehicle 102 is moving.

The alert module 602 includes the instrument panel cluster 616. The instrument panel cluster 616 is coupled to the BCM 614 and configured to provide an alert. The alert may include a variety of alerts, such as a warning via the warnings 618, a chime via the chimes 620, or a telltale via the telltale 622. The instrument panel cluster 616 may include a display, such as a human machine interface (HMI) having graphical support. The instrument panel cluster 616 is configured to provide support, such as a message center warning support, a chime support, a telltale support, a diagnostics support, or an engineering test support. For example, the instrument panel cluster 616 is configured to inform (via CAN communication) the BCM 614 and the locking mechanism 604 to apply a central lock, or a lock during a protected mode (e.g. a guard mode).

The instrument panel cluster 616 may also be configured to display the menu 624. The instrument panel cluster 616 may display a menu screen via the menu 624. The instrument panel cluster 616 is configured to receive input from the menu 624. The occupant may select various features of the menu 624, including a sensitivity level of the alert (e.g., for an active alert or a passive alert). For example, the occupant of the vehicle 102 may view and select the mode and/or sensitivity level of the alert, which will be described in further detail in FIGS. 4-6. The instrument panel cluster 616 also includes a display for the warnings 618 and the telltale 622. For example, the instrument panel cluster 616 shows the message center warning screen during the guard mode. The instrument panel cluster 616 may indicate the telltale alert when the guard mode is in operation. Additionally, the instrument panel cluster 616 may play the chimes 620. The instrument panel cluster 616 may play a chime when the guard mode is in operation. The chimes provide information to the occupants, such as informing the occupants that the guard mode has been enabled, the object 106 has been detected, and the door 104 has been locked (or unlocked).

The instrument panel cluster 616 may also be operatively coupled to other devices via the BCM 614. The instrument panel cluster 616 includes menu screens for various system components 600 such as for an intelligent door sensor (e.g. the door sensor 610) for an intelligent vehicle door (IVD). The menu screen may allow the occupant to view information from the door sensor 610, such as if the door 104 is open, and/or allow the occupant to select an option, such as unlock the door 104 or lock the door 104 for 5 seconds when the system 500 is activated. The instrument panel cluster 616 may be configured to request a camera via the menu selection (e.g. using CAN communication). The camera (e.g. traffic sensor 608) may be used to collect traffic data. The instrument panel cluster 616 may include additional and/or fewer features and are not limited to those described in this disclosure.

The safety system, or system 500 includes at least one microprocessor or BCM 614 configured to execute instructions stored on a non-transitory computer readable medium. The BCM 614 is a device that processes signals and performs general computing and arithmetic functions. The BCM 614 may include multiple single and multicore processors, co-processors, and architectures. The BCM 614 also monitors and controls the electronic accessories in the vehicle 102.

As explained above, the BCM 614 is coupled to the traffic sensor 608, the door sensor 610, the locking mechanism 604, and the instrument panel cluster 616. For example, the traffic sensor 608 is coupled to the BCM 614 and configured to capture traffic data. The door sensor 610 is coupled to the BCM 614 and configured to detect a door position. The locking mechanism 604 is coupled to the BCM 614 and is configured to lock (or unlock) the door 104. The purpose of locking the door 104 is to not only prevent the door 104 from swinging into traffic, but to provide a warning to the occupant. The warning alerts the occupant of the oncoming traffic. In other words, the system 500 is a safety measure to prevent collisions.

As generally described, the BCM 614 defines a door zone 140. The door zone 140 may be defined in a variety of ways. For example, the door zone 140 may include at least one of a door swing zone, an exit zone, or another zone. The door swing zone is based on a door swing of the door 104. The door swing zone is an area encompassing a door swing. The door swing is the area between the door 104 in a fully open position and a closed position. The door zone 140 may include an exit zone. The exit zone is an area based on the occupant exiting (or entering) the vehicle 102. The exit zone may include an area extending beyond the rear portion. The rear portion 110 is an area extending along and/or behind a rear side portion and/or a rear portion of the vehicle 102. Such an extended area provides additional clearance for the occupant to fully exit (or enter) the vehicle, close (and/or open) the door 104, and walk safely around the rear portion.

The area of the door zone 140 may be a predefined or predetermined area. The area of the door zone 140 may also change over time. For example, the BCM 614 evaluates the captured traffic data and defines the area of the door zone 140 may be based on a speed and a distance of the object 106 approaching the vehicle 102. The BCM 614 defines the door zone 140 having an appropriate size to prevent a potential collision. The BCM 614 may define the door zone 140 so that if the door 104 opens while the object 106 enters into the door zone 140, there will a reasonable amount of time for the occupant to safely exit the vehicle 102 and close the door 104. The BCM 614 may also define the door zone 140 so that there is sufficient time to activate the system 500 to provide a warning and/or an alert, together with stopping the opening of the door 104 by locking the door 104. Thus, the object 106 should be able to avoid a collision with the door 104 and/or the exiting occupant.

The system 500 may define any of the zones described in this disclosure as a predefined or predetermined area. For example, the system 500 may store information pertaining to the door swing zone based on the door swing. The system 500 may continuously or periodically define any of the zones. The system 500 may define the zone on the driver side 118 differently than the zone defined on the passenger side 126. For example, the BCM 614 may define a much larger door swing zone for a hinged door than for an unhinged sliding door.

As generally described, the BCM 614 receives the traffic data from the traffic sensor 608. The traffic sensor 608 is configured to detect the object 106 within a specific range from the door 104. The specific range or door zone 140 may be the predefined or predetermined area or range that varies depending on the traffic data collected as described above. The traffic sensor 608 may be configured to ignore traffic data outside of the door zone 140. For example, if the BCM 614 detects the object 106 in the traffic data, then the BCM 614 determines if the object is within a specific range, namely, the door zone 140. The BCM 614 receives the door position from the door sensor 610. If the BCM 614 determines that 1) the door is in the closed position, 2) the ignition is in an off condition, and 3) the object 106 is within the door zone 140, then the BCM 614 transmits instructions to the locking mechanism 604 to lock the door 104. When the door 104 is locked, the door 104 cannot substantially move in any direction. If a time period elapses, an emergency switch is activated, and/or the detection module 606 no longer detects the object 106 within the door zone 140, the BCM 614 transmits a signal with instructions to the locking mechanism 604 to unlock the door 104. The BCM 614 may transmit the signal to unlock one or more doors 104.

In another embodiment, the traffic sensor 608 is configured to ignore traffic data after a time period. If the locking mechanism 604 is engaged, the door 104 will be locked until the time period elapses. After the time period elapses, the BCM 614 is configured to unlock the door 104. After the door 104 is unlocked, the BCM 614 may cease detecting traffic data. The time period may be a predefined or predetermined period of time or it may be based on other criteria, such as the mode selected. For example, the time period may include a predetermined time between five and ten seconds. The BCM 614 may change or vary the time period.

Deactivating the system 500 may be desirable to the occupant. The system 500 may require power from the vehicle 102 and deactivating the system 500 when the system 500 is not in use minimizes energy waste. Furthermore, if the system 500 is not deactivated during certain situations, the system 500 may limit functionality of other features of the vehicle 102. For example, a parent has put the vehicle 102 into park to pick up a child. The system 500 may detect the child and identify the child as an object 106 within the door zone 140. In this situation, the child would not be able to open the door 104 because the door 104 would be locked shut. The system 500 may include a manual deactivation feature, such as an emergency switch that the occupant may activate to deactivate the system 500. The emergency switch is operatively coupled to the BCM 614 and configured to unlock the door 104. The emergency switch may be activated using the instrument panel cluster 616 or another device. The occupant may also operate the emergency switch in an emergency situation or if the occupant determines that the object 106 is not in danger of colliding with the door 104. The occupant may operate the emergency switch by using voice command, pressing a button or switch, or using another system or method. The system 500 may be in a deactivated state unless the system 500 is activated. For example, the occupant turns on the system 500 for the system 500 to function.

Any of the additional sensors, alerts, and components may be included or excluded from the system 500 and used in any order or combination. For example, the detection module 606 may include a sensor for detecting movement of an inner door handle of the vehicle 102. The system 500 may deactivate if the door 104 is opened but the sensor does not detect movement of the inner door handle. In other words, if someone opens the door from outside the vehicle, the system 500 will not prevent the door 104 from opening. The system 500 may also have an airbag sensor configured to detect when an airbag is deployed. If the airbag is deployed, then the system 500 may deactivate so that the occupant may open the door 104 to exit the vehicle 102 after an accident regardless if the system 500 detects an object 106 within the door zone 140. The system 500 may include additional and/or fewer components and is not limited to those illustrated in FIG. 6.

Figure 7:
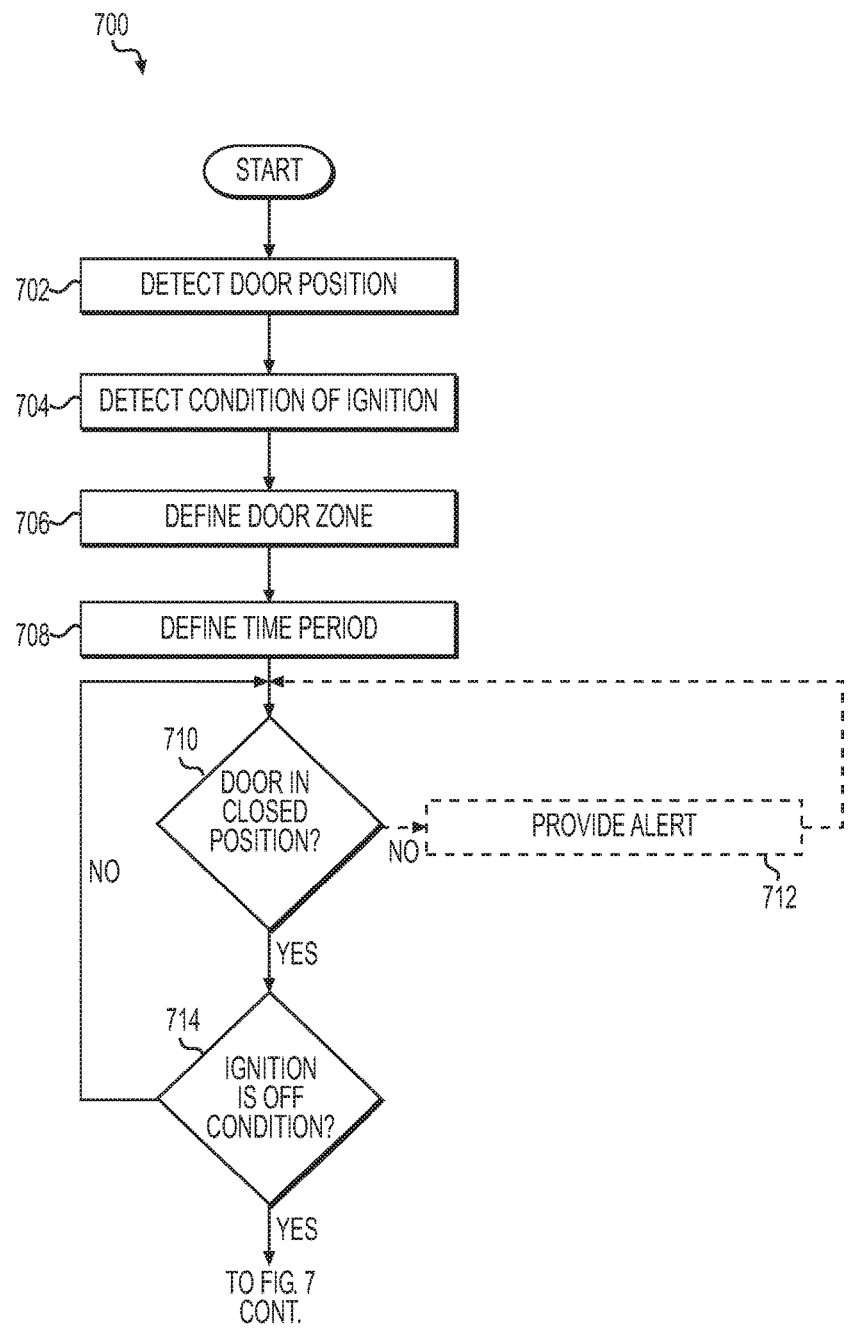
FIG. 7 is a flow chart illustrating an exemplary process for implementing the system in accordance with one aspect of the present disclosure.
Figure 7:
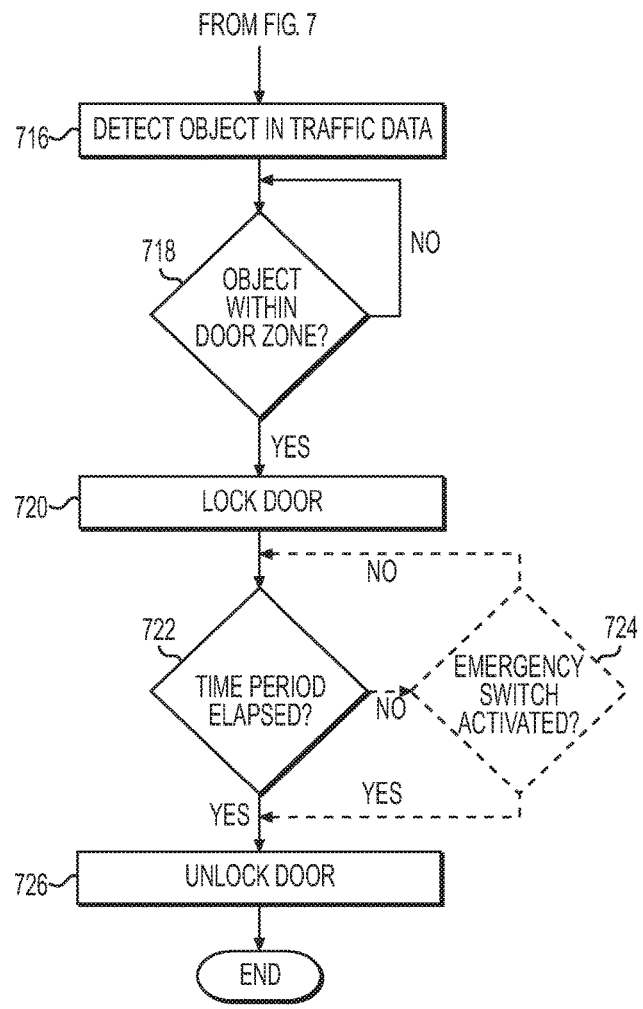

FIG. 7 illustrates an exemplary process 700 for stopping an opening of the door 104 of the vehicle 102 in accordance with one aspect of the present disclosure. The process 700 generally uses the system 500 having the system components 600, such as the detection module 606, the alert module 602, and the locking mechanism 604 to prevent possible impacts from traffic traveling toward the vehicle 102. The system 500 detects oncoming traffic and locks the door opening process early enough to prevent the door 104 from getting into the way of or colliding with the oncoming traffic.

The system 500 begins at step 702 by detecting a position of the door 104. The detection module 606, which includes the door sensor 610, detects the position of the door 104. The positions detected include at least a closed position, an open position, and a partially open position. The door sensor 610 may also detect the position of a second door, such as the back door 120, the passenger door 124, or another door. The BCM 614 receives the door position information from each door 104 of the vehicle 102.

At step 704, the condition of the ignition is detected by the ignition sensor 612. The condition of the ignition includes the on condition and the off condition. The ignition sensor 612 may also detect the RPM of the engine and the BCM 614 determines the condition of the engine/ignition. For example, the condition may be considered in the off condition if the engine is operating at less than or equal to 500 RPM.

At step 706, the BCM 614 defines the door zone 140. At step 708, the BCM 614 defines the time period. The door zone 140 and the time period may be defined in numerous ways, including those described above.

At decision step 710, the BCM 614 determines if the door 104 is in the closed position. If the door 104 is not in the closed position, then the process may optionally proceed to step 712 to provide an alert. Otherwise the process may loop and continue detecting the position and/or end the process. In some embodiments, all doors 104 of the vehicle 102 must be in the closed position for the process to continue. In another embodiment, the process may continue for the door 104 in the closed position and end for the door 104 in the open position. For process 700, if the door 104 is in the closed position, then the process continues to decision step 714.

At decision step 714, the BCM 614 determines if the ignition is in an off condition. If the ignition is not in the off condition, then the process loops back to decision step 710. The process may also loop back to decision step 714, another step, or end. If the ignition is in the off condition, then the process continues to step 716.

At step 716, the system 500 detects traffic data, and more specifically, detects the object 106 in the traffic data. At decision step 718, the BCM 614 identifies the object 106 and determines if the object 106 is within the door zone 140 of the vehicle door 104. If the object 106 is not within the door zone 140, the process loops back to decision step 718. If the object 106 is within the door zone 140, then the process continues to step 720.

At step 720, the system 500 proceeds to lock the door 104, for example, but using the locking mechanism 604. The locking mechanism 604 may lock one or more of the doors 104. For example, the locking mechanism 604 may lock all of the doors 104 if the object 106 is within the door zone 140 of any door 104, the doors on the same side as the oncoming object 106, or just the door 104 corresponding to the door zone 140 having the object 106. In other words, the locking mechanism 604 may also lock the second door, such as the back door 120, the passenger door 124, another door, or all doors 104 if the object 106 is detected within the door zone 140 of the second door and the second door is in the closed position. After the door(s) 104 is locked, the process continues to decision step 722.

At decision step 722, the BCM 614 determines if the time period has elapsed. If the time period has not elapsed, then the process 700 loops back to decision step 722. The process may optionally proceed to decision step 724. At decision step 724, the BCM 614 determines if the emergency switch has been activated. If the emergency switch has not been activated, then the process 700 loops back to decision step 722. If the emergency switch has been activated, then the process 700 continues to step 726 to unlock the locked door 104. Likewise, if the BCM 614 determines that the time period has elapsed, process continues to step 726. At step 726, the locked door 104 is unlocked and the process 700 ends.

Additional steps, such as providing an alert, a warning, or a menu screen, may be added and are not limited to the additional steps described in this disclosure. The process 700 may also contain fewer steps. Moreover, the system 500 may implement the steps in a different order than shown in process 700.

Figure 8:
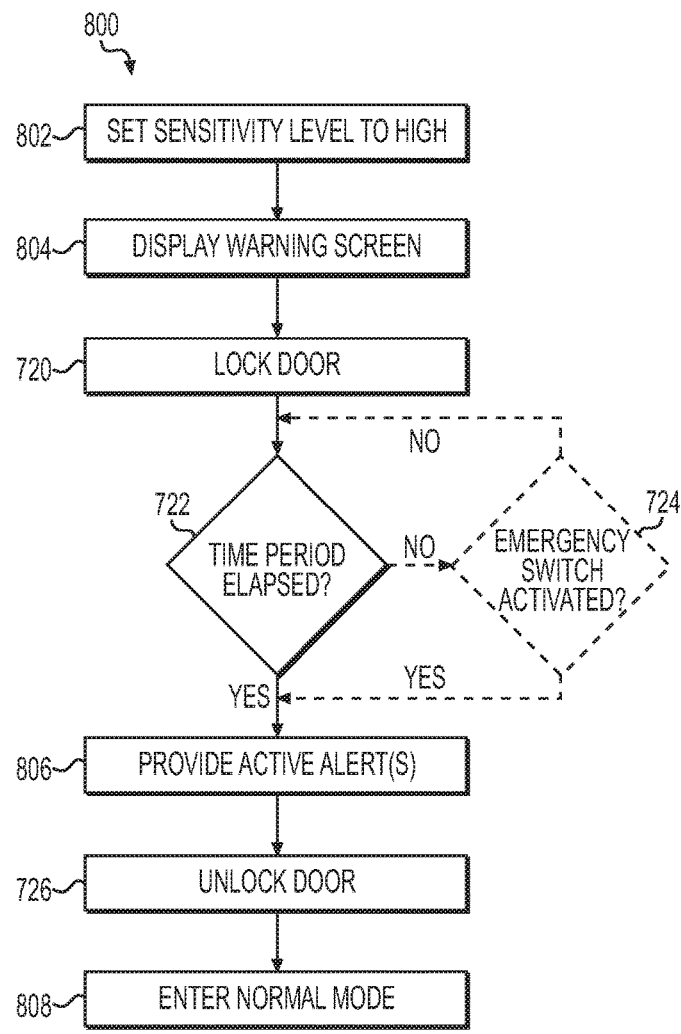
FIG. 8 is a flow chart illustrating an exemplary process for implementing an active alert in accordance with one aspect of the present disclosure.

The instrument panel cluster 616 includes a display and the display is configured to receive a selection of a sensitivity level. The alert is implemented based on the selected sensitivity level (e.g. a sensitivity level for the active alert or a sensitivity level for the passive alert), FIG. 8 illustrates an exemplary process for implementing an active alert 800 in accordance with one aspect of the present disclosure. The active alert 800 may be activated when certain conditions are met. For example, all doors 104 of the vehicle 102 must be in the closed position. The ignition must be in the off condition (or the engine is less than or equal to 500 RPM). Before or at the time that the door position changes to the open position (or the opening position), the following processes occur. Once the ignition is switched off, the traffic sensor 608 detects the object 106 near the vehicle 102 and/or door zone 140. If the object 106 is detected within the door zone NO, then all the vehicle doors 104 automatically lock for a time period, which acts as a door guard. This mode is referred to as either guard mode or protected mode.

The instrument panel cluster 616 is the master block for the guard mode. The instrument panel cluster 616 includes a menu screen for the occupant to select the sensitivity level. At step 802, the sensitivity level is set to high for the active alert 800. The instrument panel cluster 616 may display a menu 624 to request a traffic sensor 608 to detect traffic. At step 804, the instrument panel duster 616 displays the message center warning screen during the guard mode. The instrument panel cluster 616 may indicate the situation via the HMI display. For example, the traffic data, including the approaching object 106, may be displayed on the HMI, together with an indication of the activated guard mode. The active alert 800 proceeds to step 720 and decision steps 722, 724, as described in FIG. 7. For example, the instrument panel cluster 616 uses CAN communication to inform the BCM 614 to provide instructions to the locking mechanism 604 to lock the door(s) 104. The emergency switch can optionally be activated in decision step 724 to immediately exit out of the guard mode. The door 104 will be locked until the time period has elapsed.

At step 806 and during various other stages of the active alert 800, the instrument panel cluster 616 provides active alert(s). In fact, the instrument panel cluster 616 informs the occupant of the activated guard mode through warnings, telltale, and chimes at different states of operation, such as during a conventional door operation. For example, the instrument panel cluster 616 provides an alert to the occupant when the door is locked. The instrument panel cluster 616 also provides an alert to the occupant while the occupant is trying to open the door 104. The instrument panel cluster 616 indicates the telltale alert via the telltale 622 when the guard mode is in operation. The instrument panel cluster 616 plays a chime via the chimes 620 during the operation. The alert module 602 provides the occupant with a reminder of the flooring issues of opening the door 104 and exiting the vehicle 102. The alert also provides the occupant with a warning of potential danger of the approaching object 106. The active alert 800 may be activated when the door position is in at least one of a closed position, an opening position, or an open position.

At step 726, the door 104 is unlocked. For example, after the time period of 5-10 seconds has elapsed, the lock on the door 104 is automatically released from guard mode. The system 500 then enters to a normal mode (e.g. a conventional door operation) at step 808, which ends the active alert 800. Active alert 800 may include all or some of the steps of process 700.

Figure 9:
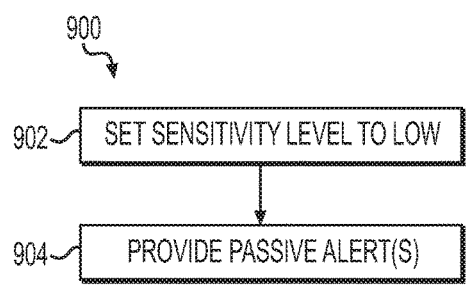
FIG. 9 is a flow chart illustrating an exemplary process for implementing a passive alert in accordance with one aspect of the present disclosure.

FIG. 9 illustrates an exemplary process for implementing a passive alert 900 in accordance with one aspect of the present disclosure. The instrument panel cluster 616 includes the menu screen for the occupant to select the sensitivity level. At step 902, the sensitivity level is set to low for the passive alert 900. At step 904, passive alert(s) are provided. For example, a passive alert may be used for a situation in which the object 106, such as a cyclist, is approaching the vehicle 102. An image of the cyclist or an icon for a cyclist is displayed on the instrument panel cluster 616 or another display such as an infotainment system. The passive alerts act as general alerts of an approaching object 106, such as a vehicle or a pedestrian. The alert may be an image or icon to represent the approaching object 106. The passive alert 900 may include features of the alert module 602 as described in this disclosure. The passive alert 900 may be activated when the door position is in at least one of a closed position, an opening position, or an open position. The passive alert 900 mainly serves as a general purpose reminder instead of actively locking the door 104.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system for preventing a door of a vehicle from opening into an object, comprising:
   a detection module configured to:
   identify the object within a danger zone of the vehicle; and
   detect the opening of the door; and
   a locking mechanism coupled to the detection module and configured to lock the door in a partially open position if the object is identified within the danger zone and the opening of the door is detected,
   wherein the locking mechanism unlocks the door from the partially open position if the detection module does not identify the object within the danger zone or after a predetermined time has elapsed or both.

2. The system of claim 1, further comprising:
   a microprocessor, coupled to the locking mechanism and configured to execute instructions stored on a non-transitory computer readable medium;
   an external sensor coupled to the microprocessor and configured to capture traffic data; and
   a door sensor coupled to the microprocessor and configured to detect a door position;
   wherein the microprocessor is further configured to:
   define a danger zone;
   receive the traffic data from the external sensor;
   detect an object in the traffic data;
   determine if the object is within the danger zone;
   receive the door position from the door sensor;
   determine if the door position is an open position; and
   transmit instructions to the locking mechanism to lock the door in the partially open position, if the object is within the danger zone and the door position is the open position.

3. The safety system of claim 2, wherein the microprocessor is further configured to:
   define a monitoring zone;
   detect the object in the monitoring zone; and
   determine if the object will enter the danger zone within a time frame.

4. The safety system of claim 3, wherein the microprocessor is further configured to ignore the object if determined that the object will not enter the danger zone within the time frame.

5. The safety system of claim 2, wherein the traffic data includes a speed of the object and a distance of the object from the vehicle and the danger zone is defined based on at least the speed and the distance.

6. The safety system of claim 2, further comprising:
   an occupancy sensor coupled to the microprocessor and configured to detect an occupant within in the vehicle, wherein the microprocessor is further configured to activate the safety system if the occupant is detected.

7. The safety system of claim 6, wherein the safety system is deactivated if the occupant is not detected in the vehicle.

8. The safety system of claim 2, further comprising:
   a seatbelt sensor coupled to the microprocessor and configured to detect an unbuckled seatbelt proximate to an occupant of the vehicle, wherein the microprocessor is further configured to activate the safety system if the unbuckled seatbelt is detected.

9. The safety system of claim 2, further comprising:
   a stop sensor coupled to the microprocessor and configured to detect a stop position of the vehicle, wherein the microprocessor is further configured to activate the safety system if the stop position is detected.

10. A system for preventing a door of a vehicle from opening into an object, comprising:
    a detection module configured to:
    detect a position of a vehicle door;
    detect a condition of an ignition; and
    identify the object within a door zone of the vehicle door; and
    a locking mechanism coupled to the detection module and configured to lock the door for a time period if the object is identified within the door zone,
    wherein the locking mechanism is further configured to unlock the door after the time period elapses.

11. The system of claim 10, wherein the locking mechanism is further configured to lock the door if the condition of the ignition is an off condition.

12. The system of claim 10, wherein the locking mechanism is further configured to lock the door if the position of the vehicle door is a closed position.

13. The system of claim 10, further comprising an alert module coupled to the detection module and configured to provide an alert.

14. A safety system for opening a door of a vehicle, comprising:
    a body control module (BCM), the BCM being configured to execute instructions stored on a non-transitory computer readable medium;
    a traffic sensor coupled to the BCM and configured to capture traffic data;
    a door sensor coupled to the BCM and configured to detect a door position;
    a locking mechanism coupled to the BCM and configured to lock the door,
    wherein the BCM is further configured to
    define a door zone,
    receive the traffic data from the traffic sensor,
    detect an object in the traffic data,
    determine if the object is within the door zone,
    receive the door position from the door sensor,
    determine if the door position is a closed position, transmit instructions to the locking mechanism to lock the door, if the object is within the door zone and the door position is the closed position, and transmit instructions to the locking mechanism to unlock the door if the object is no longer within the door zone or a predetermined time has elapsed, or both; and an emergency switch coupled to the BCM and configured to unlock the door.

15. The safety system of claim 14, wherein the system further comprises an instrument panel cluster coupled to the BCM and configured to provide an alert.

16. The safety system of claim 14, wherein the alert is activated when the door position is at least one of the closed position, an opening position, and an open position.

17. The safety system of claim 15, wherein the instrument panel cluster is further configured to provide at least one of:

a human machine interface (HMI), the HMI having graphical support;
a message center warning support;
a menu selection option for door sensor;
a chime support;
a telltale support;
a diagnostics support; and
an engineering test support.

* * * * *